United States Patent [19]

Tovrog et al.

[11] Patent Number: 4,567,155

[45] Date of Patent: Jan. 28, 1986

[54] OLEFIN POLYMERIZATION CATALYST SYSTEM PRODUCING POLYMER WITH LOW ACTIVE CHLORIDE

[75] Inventors: Benjamin S. Tovrog; Charles R. Hoppin, both of Naperville; Bryce V. Johnson, Elburn, all of Ill.

[73] Assignee: Standard Oil Company (Indiana), Chicago, Ill.

[21] Appl. No.: 653,211

[22] Filed: Sep. 24, 1984

[51] Int. Cl.$^4$ ................................................ C08F 4/64
[52] U.S. Cl. .................................... 502/123; 502/121; 502/122; 526/124; 526/125; 526/141
[58] Field of Search ......................... 502/121, 122, 123

[56] References Cited

U.S. PATENT DOCUMENTS

| | | | |
|---|---|---|---|
| 3,318,860 | 5/1967 | Eichenbaum | 502/123 X |
| 3,670,043 | 6/1972 | Kubicek et al. | 502/123 X |
| 4,279,776 | 7/1981 | Shiga et al. | 502/123 X |
| 4,310,439 | 1/1982 | Langer | 502/123 |
| 4,312,784 | 1/1982 | Welch | 502/123 X |
| 4,324,690 | 4/1982 | Karayannis et al. | 502/123 X |
| 4,400,302 | 8/1983 | Goodall et al. | 502/123 X |
| 4,431,570 | 2/1984 | Johnson | 502/123 X |

FOREIGN PATENT DOCUMENTS 42-27050 12/1967 Japan ...................... 502/123

*Primary Examiner*—Patrick P. Garvin
*Attorney, Agent, or Firm*—Wallace L. Oliver; William T. McClain; Ralph C. Medhurst

[57] ABSTRACT

A catalyst system especially suited for polymerizing alpha-olefins in the gas-phase to polymers containing essentially no active chloride comprises (A) a titanium-containing component supported on a hydrocarbon-insoluble magnesium-containing compound in combination with an electron donor compound and (B) a cocatalyst comprising (a) at least one trialkylaluminum compound (b) an aromatic acid ester and (c) an unhindered secondary amine, optionally reacted with a dialkylaluminum hydride, in substantial absence of compounds containing an Al-Cl bond.

19 Claims, No Drawings

OLEFIN POLYMERIZATION CATALYST SYSTEM PRODUCING POLYMER WITH LOW ACTIVE CHLORIDE

BACKGROUND OF THE INVENTION

This invention relates to olefin polymerization catalysts and more particularly relates to use of supported propylene polymerization catalysts in gas-phase polymerization in combination with a chloride-free co-catalyst system.

Gas-phase polymerization of olefins, especially propylene, has become an attractive commercial process. In gas-phase polymerization, gaseous olefin monomer is contacted with a catalyst system to form solid polymer without solvent or diluent. Catalyst systems useful in gas-phase polymerization must be very active. Because the forming polymer is not in contact with a solvent or diluent, such as paraffinic hydrocarbon, there is no inherent removal of hydrocarbon-soluble polymer products such as amorphous or atactic material. Therefore, catalyst systems used in gas-phase polymerization also must produce relatively low amounts of such amorphous or atactic material.

Typically, polymer produced from a gas-phase reactor is in the form of a dry powder. Sometimes it is advisable to treat such powder with a flowing gas-stream such as nitrogen containing a catalyst deactivation agent such as water, air, oxygen, alcohol, ammonium compounds, carbon oxides and the like to deactivate catalyst residues remaining in a polymer powder. If substantial amounts of corrosive catalyst residues remain in the powder, expensive stabilization agents must be incorporated within the polymer to avoid corrosion of fabrication equipment. Chlorine compounds in polymers such as polypropylene are noted as creating corrosivity problems. Although all chlorine compounds do not exhibit the same corrosivity problems, a test for "active chloride" shows levels of chlorine-containing compounds which are associated with corrosivity. A common component in olefin polymerization catalyst systems are alkyl aluminum chlorides such as diethylaluminum chloride. A method to avoid active chloride is to minimize, or preferably eliminate, incorporation as such alkylaluminum chlorides in catalyst systems.

As noted above, gas-phase polymerization systems show considerable commercial advantage. However, it has been found that catalyst systems generally useful for slurry or bulk polymerization may not be used successfully in gas-phase polymerizations. The present invention demonstrates this fact. Olefin polymerization using a titanium-containing compound in combination with alkylaluminum compounds are well known as Ziegler-Natta catalysts. There are many variations of this concept in the art with a variety of forms of titanium compounds, alkylaluminum compounds and many varieties of modifiers and promoter packages. Various titanium compounds supported on magnesium-containing compounds have been reported including U.S. Pat. Nos. 3,901,863 and 4,227,370, all incorporated by reference herein.

Co-catalysts incorporating secondary amines have been disclosed in certain contexts. For example, U.S. Pat. Nos. 4,094,818, 4,224,181 and 4,224,182 describe the use of hindered amine compounds such as 2,2,6,6-tetramethylpiperidine as one component in a cocatalyst system. U.S. Pat. Nos. 4,431,570, 4,431,571 and 4,431,572, all incorporated by reference herein, describe catalyst systems in which comminuted supported titanium-containing catalyst component is retreated with a mixture containing a titanium halide, at least one organic acid ester and, optionally, a chlorocarbon or a haloalkylchlorosilane.

Olefin polymerization catalysts, especially propylene polymerization catalysts, supported on a magnesium-containing compound and containing an electron donor compound such as an alkyl aromatic acid ester have been described widely.

SUMMARY OF THE INVENTION

A catalyst system especially suited for polymerizing alpha-olefins in the gas-phase to polymers containing essentially no active chloride comprises (A) a titanium-containing component supported on a hydrocarbon-insoluble magnesium-containing compound in combination with an electron donor compound and (B) a co-catalyst comprising (a) at least one trialkylaluminum compound (b) an aromatic acid ester and (c) an unhindered secondary amine, optionally reacted with a dialkylaluminum hydride, in substantial absence of compounds containing an Al—Cl bond.

BRIEF DESCRIPTION OF THE INVENTION

The invention described herein involves the co-catalyst component of a Ziegler-Natta olefin polymerization catalyst system. Typically, a titanium-containing component is introduced into a polymerization reaction together with co-catalyst component comprising an alkylaluminum compound and selected modifier compounds. This invention is directed to a co-catalyst component system which can be used with a supported titanium-containing component which does not introduce active chloride species into resulting polymer while maintaining high activity and acceptable levels of amorphous polymer production. The catalyst system described herein especially is useful in gas-phase olefin polymerization systems which retain amorphous polymer and active chloride species in polymer produced with minimal deactivation procedures. It has been found that catalysts prepared according to this invention polymerize alpha-olefins, specifically propylene, to highly crystalline polymer with essentially no active chloride species.

The co-catalysts of this invention are based on three components in combination. A trialkylaluminum is combined with an alkyl aromatic acid ester and an alkyl unhindered secondary amine or a secondary amine reacted with dialkylaluminum hydride.

Unhindered aliphatic secondary amines useful in this invention include those with a formula $RR^1NH$ wherein R and $R^1$ are the same or different alkyl groups containing from two to about eight carbon atoms, which, if branched, contain no more than one methyl group attached to the carbon atom adjacent to the nitrogen atom. Aromatic amines are not included in amines useful in this invention. It is contemplated also that this formula includes cyclic secondary amines containing four to about ten carbon atoms. Specific examples of unhindered secondary amine include piperidine, 2-methyl piperidine, 4-ethyl piperidine, 3,5-dimethyl piperidine, pyrrolidine, homopiperidine, piperazine, 2-methyl pyrrolidine, diethyl amine, di-n-propylamine, dicyclohexylamine, ethylpropylamine, ethyl-s-butylamine and the like. Cyclic unhindered secondary amines are preferred wherein there is no more than one methyl group on a carbon adjacent to a nitrogen atom. More preferred are cyclic amines with no alkyl substituents such as piperidine, pyrrolidine, homopiperidine and piperazine. Piperidine is the most preferred.

In another aspect of this invention, the above-described unhindered secondary amines may be reacted with a dialkylaluminum hydride such as diisopropylaluminium hydride. Typically, suitable dialkylaluminum hydrides contain alkyl groups having from about two to about six carbon atoms such as diethylaluminum hydride or di-n-butyl aluminum hydride. Diisobutylaluminum hydride is preferred. Generally, such an amine-aluminum hydride reaction product is prepared by combining approximately equimolar amounts of each component typically in an inert diluent such as a paraffinic hydrocarbon. The resulting reaction product may be used in further preparation of a co-catalyst without separation or purification of the product.

Co-catalysts of this invention include a trialkylaluminum with a formula RR'R"Al wherein R, R', R" are alkyl groups contain from two to about six carbon atoms. Examples of such trialkylaluminum include tri-n-butylaluminum, tri-isobutylaluminum, tri-s-butylaluminum, tri-n-pentylaluminum, tri-iso-pentylaluminum, and tri-hexylaluminum. Mixtures of trialkylaluminums can be used. Preferred trialkylaluminums include triethylaluminum, triisobutylaluminum and a combination thereof. The most preferred trialkylaluminum is a combination of triethylaluminum and triisobutylaluminum.

Use of the co-catalyst system of this invention in polymerization of an alpha-olefin such as propylene yields a polymer which generally contains essentially no active chloride even though chloride in some form may be present. Such non-active chloride may be introduced through the supported titanium-containing component. In order to preserve the lack of active chloride in the polymer, compounds containing an Al—Cl bond should be avoided during polymerization. Active Chloride is measured as the amount of hydrogen chloride gas evolved while passing a stream of nitrogen over a molten polypropylene sample at 300° C. in parts per million by weight (ppm). Typically, "active chloride" determinations are run in duplicate or triplicate with each measurement reported individually. It is contemplated that polymer containing essentially no "active chloride" contains less than 20 ppm, preferably less than 10 ppm, "active chloride."

Applicants believe that addition of the unhindered secondary amine according to this invention suppresses ester alkylation and reduction, which is most pronounced in a solventless system such as gas-phase polymerization. In addition, use of such amines according to this invention is believed to promote improved polymer stability. Since the co-catalyst is dispersed uniformly in the polymeric material, a more even distribution of such stabilization effect should be observed.

In the cocatalyst composition of this invention, the trialkylaluminum compound is employed in at least an amount which is effective to promote the polymerization activity of the supported component. Preferably the ratio of moles of trialkylaluminum component to gram-atom of titanium in the supported component is at least about 3:1. More preferably, this ratio ranges from about 50:1 to about 500:1, and typically about 100:1 to about 300:1 although substantially greater amounts of alkylaluminum component also can be used with desirable results.

The molar ratio of trialkylaluminum to aromatic ester compound in the cocatalyst typically may vary from about 1.0 to about 10, preferably from about 2.5 to about 4.5. The molar ratio of unhindered secondary amine to alkylaluminum compound useful in the co-catalyst of this invention may vary from about 1.0 to about 0.1, preferably from about 0.75 to about 0.25.

Titanium-containing components useful in this invention generally are supported on hydrocarbon-insoluble, magnesium-containing compounds in combination with an electron donor compound. Such supported titanium-containing olefin polymerization catalyst component typically is formed by reacting a titanium(IV) halide, an electron donor compound and a hydrocarbon-insoluble magnesium-containing compound. Optionally, such supported titanium-containing reaction product may be further treated or modified by comminution or further chemical treatment with additional electron donor or Lewis acid species.

Suitable hydrocarbon-insoluble, magnesium-containing compounds can be a magnesium halide; a reaction product of a magnesium halide such as magnesium chloride or magnesium bromide, with an organic compound, such as an alcohol or an organic acid ester or with an organometallic compound of metals of Groups I–III. A preferable magnesium-containing compound is based on at least one magnesium alcoholate which may be pretreated with at least one modifier such as mineral acid or anhydrides of sulfur, organometallic, chalcogenide derivative of hydrogen sulfide, and organic acids and esters thereof. Such magnesium-containing compound may be the pretreatment product of at least one magnesium alcoholate, at least one Group II or IIIA metal alkyl and, optionally, at least one modifier such as a mineral acid or an anhydride, sulfur, organometallic chalcogenide derivatives of hydrogen sulfide, organic acids and organic acid esters.

Organic electron donors useful in preparation of stereospecific supported catalyst components can be organic compounds containing one or more atoms of oxygen, nitrogen, sulfur and phosphorus. Such compounds include organic acids, organic acid esters, alcohols, ethers, aldehydes, ketones, amines, amine oxides, amides, thiols and various phosphorous acid esters and amides and like. Mixtures of organic electron donors can be used if desired. Suitable nitrogen-containing compounds include amines such as piperidine and 2,2,6,6-tetramethylpiperidine. Specific examples of useful oxygen-containing electron donor compounds include organic acids and esters. These compounds also can be used to pretreat a magnesium-containing component. Useful organic acids contain from 1 to about 20 carbon atoms and 1 to about 4 carboxyl groups.

Titanium(IV) compounds useful in preparation of the stereospecific supported catalyst components of this invention are titanium halides and haloalcoholates having 1 to about 20 carbon atoms per alcoholate group. Mixtures of titanium compounds can be employed if desired.

Preferred titanium compounds are the halides and haloalcoholates having 1 to about 8 carbon atoms per alcoholate group. Examples of such compounds include $TiCl_4$, $TiBr_4$, $Ti(OCH_3)Cl_3$, $Ti(OC_2H_5)Cl_3$, $Ti(OC_4H_9)Cl_3$, $Ti(OC_6H_5)Cl_3$, $Ti(OC_6H_{13})Br_3$, $Ti(OC_8H_{17})Cl_3$, $Ti(OCH_3)_2Br_2$, $Ti(OC_2H_5)_2Cl_2$, $Ti(OC_6H_{13})_2Cl_2$, $Ti(OC_8H_{17})_2Br_2$, $Ti(OCH_3)_3Br$, Ti- $(OC_2H_5)_3Cl$, $Ti(OC_4H_9)_3Cl$, $Ti(OC_6H_{13})_3Br$, and $Ti(OC_8H_{17})_3Cl$. Titanium tetrahalides, particularly titanium tetrachloride ($TiCl_4$), are most preferred.

From the standpoint of catalyst performance and preparative ease, the organic electron donors which are preferred according to this invention are $C_1$–$C_6$ alkyl esters of aromatic monocarboxylic acids and halogen-, hydroxyl-, oxo-, alkyl-, alkoxy-, aryl-, and aryloxy-substituted aromatic monocarboxylic acids. The preferred electron donor compounds include esters of aromatic acids. Among these, the alkyl esters of benzoic and halobenzoic acids wherein the alkyl group contains 1 to about 6 carbon atoms, such as methyl benzoate, methyl bromobenzoate, ethyl benzoate, ethyl chlorobenzoate, ethyl bromobenzoate, butyl benzoate, isobutyl benzoate, hexyl benzoate, and cyclohexyl benzoate, are particularly preferred. Other preferred esters include ethyl anisate, methyl p-toluate and dialkylphthalate esters such as diisobutylphthalate.

In preparation of the stereospecific supported catalyst components of this invention, typically, the magnesium-containing product, titanium(IV) component, and organic electron donor component are contacted in amounts such that the atomic ratio of titanium to metal in the magnesium-containing component employed in pretreatment is at least about 0.5:1. Preferably, this ratio ranges from about 0.5:1 to about 20:1 and more preferably, from about 2:1 to about 15:1. The electron donor component is used in an amount ranging from about 0.001 to about 1.0 mole per gram atom of titanium, and preferably from about 0.005 to about 0.6 mole per gram atom. Best results are achieved when this ratio ranges from about 0.01 to about 0.3 mole per gram atom of titanium.

The sequence in which the components are contacted may be varied. Suitably, magnesium-containing product, titanium(IV) component, and electron donor component are contacted concurrently or two of the components are contacted followed by addition of the remaining component. From the standpoint of catalyst performance and preparative ease, the preferred preparative sequence is to combine the magnesium-containing product and titanium(IV) component and then add the organic electron donor component to the result.

The magnesium-containing product, titanium(IV), and electron donor components preferably are contacted in the presence of an inert hydrocarbon or halogenated hydrocarbon diluent, although other suitable techniques can be employed. Examples of suitable diluents include hexane, heptane, nonane, toluene, xylene, 1,1,2-trichloroethane, 1,2-dichloroethane and carbon tetrachloride.

Reaction between the magnesium-containing product, titanium component, and organic electron donor is carried out at temperatures ranging from about 50° to about 170° C. Best results are obtained at about 90° to about 130° C. Generally the reaction is carried out over a period of several minutes to several hours, with about ½ to about 10 hours giving good results at economical rates. Most preferably, the reaction time ranges from about 1 to about 5 hours. When the components employed in preparation of the invented catalyst components are contacted according to the preferred preparative sequence, best results are attained when the magnesium-containing product and titanium(IV) component are combined at about ambient temperature followed by addition of electron donor, at about ambient temperature and with agitation, over about ¼ to about 1½ hours and then heating at about 90° to about 130° C. for about ½ to about 3 hours with continued agitation.

In addition, the reaction mixture of the magnesium-containing product, titanium component and electron donor can contain an organochlorosilane in a concentration up to about 80 mole % based upon titanium.

A magnesium-containing product useful in catalysts in this invention preferably is obtained by contacting pretreatment components comprising (a) at least one magnesium alcoholate of the formula $Mg(OR^1)_n(OR^2)_{2-n}$ wherein $R^1$ and $R^2$ are identical or different hydrocarbyl radicals of 1 to about 20 carbon atoms and n ranges from 0 to 2; and (b) at least one Group II or IIIA metal alkyl containing 1 to about 20 carbon atoms per alkyl radical.

The pretreatment components optionally may include at least one modifier selected from the group consisting of mineral acids and anhydrides of sulfur, organometallic chalcogenide derivatives of hydrogen sulfide, organic acids and esters thereof.

Specific examples of magnesium alcoholates which are useful in forming a pretreated magnesium-containing component useful in this invention include $Mg(OCH_3)_2$, $Mg(OC_2H_5)_2$, $Mg(OC_4H_9)_2$, $Mg(OC_6H_5)_2$, $Mg(OC_6H_{13})_2$, $Mg(OC_9H_{19})_2$, $Mg(OC_{10}H_7)_2$, $Mg(OC_{12}H_9)_2$, $Mg(OC_{12}H_{25})_2$, $Mg(OC_{16}H_{33})_2$, $Mg(OC_{20}H_{41})_2$, $Mg(OCH_3)(OC_2H_5)$, $Mg(OCH_3)(OC_6H_{13})$, $Mg(OC_2H_5)(OC_8H_{17})$, $Mg(OC_6H_{13})(OC_{20}H_{41})$, $Mg(OC_3H_7)(OC_{10}H_7)$, and $Mg(OC_{16}H_{33})(OC_{18}H_{37})$. Mixtures of magnesium alcoholates also can be employed if desired. Additionally, although not preferred, mixtures of magnesium alcoholates with minor amounts of other suitable metal salts such as alcoholates of lanthanum and the lanthanide metals, magnesium halides, hydroxyhalides, carboxylates, and so forth can be used.

Preferred magnesium alcoholates useful in catalysts in this invention have the formula $Mg(OR^1)_2$ wherein $R^1$ is an alkyl radical of 1 to about 6 carbon atoms, an aryl radical of 6 to about 12 carbon atoms or an alkaryl or aralkyl radical of 6 to about 12 carbon atoms. Use of magnesium ethoxide is preferred. Magnesium hydrocarbyl carbonates also can be used.

Preferred Group II and IIIA metal alkyls are those of magnesium, zinc, and aluminum wherein the alkyl radicals contain 1 to about 12 carbon atoms. Trialkylaluminums containing 1 to about 6 carbon atoms per alkyl radical, such as triethylaluminum and triisobutylaluminum are used.

The pretreated magnesium-containing component is obtained by contacting components comprising at least one magnesium alcoholate and at least one Group II or IIIA metal alkyl. The components are employed in amounts such that the atomic ratio of metal in the Group II or IIIA metal alkyl component to metal in the magnesium alcoholate component ranges from about 0.001:1 to about 1:1. Preferably, this ratio ranges from about 0.005:1 to about 0.5:1. If a pretreatment modifier is used, the amount of such modifier ranges from about 0.001 to about 2 moles of pretreatment modifier per mole of Group II or IIIA metal alkyl component, preferably, from about 0.005:1 to about 1:1, and particularly from about 0.01:1 to about 0.5:1.

Diluents suitable for use in pretreatment include hydrocarbons and halogenated derivatives thereof that are substantially inert to the pretreatment components employed and, preferably, are liquid at pretreatment temperatures. Examples of useful diluents include alkanes such as hexane, cyclohexane, ethylcyclohexane, heptane, octane, nonane, decane, undecane, and so forth; aromatics such as xylenes and ethylbenzene; and halogenated and hydrogenated aromatics such as chlorobenzene, o-dichlorobenzene, tetrahydronaphthalene, and decahydronaphthalene. Preferred diluents are the alkanes and especially hexane. Optionally, all or part of the pretreatment may be conducted in the presence of one or more alpha-olefins which, when introduced into the preparative system in gaseous form, can serve to exclude catalyst poisons. The presence of one or more alpha-olefins during pretreatment also can result in improved stereospecificity. Useful alpha-olefins include ethylene, propylene, butene-1, pentene-1, 4-methylpentene-1, hexene-1, and mixtures thereof. Of course, any alpha-olefin employed during pretreatment should be of relatively high purity, for example, polymerization grade or higher. Other precautions which aid in excluding poisons include purification of any diluent to be employed, such as by percolation through molecular sieves and/or silica gel prior to use, and drying and/or heating of magnesium alcoholate pretreatment components.

As a result of the pretreatment, there is obtained a hydrocarbon-insoluble, magnesium-containing pretreatment product which can be reacted with at least one halogen-containing titanium(IV) compound and at least one organic electron donor to form a stereospecific supported catalyst component especially useful in the stereospecific polymerization of alpha-olefins of 3 or more carbon atoms.

Due to the sensitivity of catalyst components to catalyst poisons such as water, oxygen, and carbon oxides, the catalyst components are prepared in the substantial absence of such materials. Catalyst poisons can be excluded by carrying out the preparation under an atmosphere of an inert gas such as nitrogen or argon, or an atmosphere of alpha-olefin. As noted above, purification of any diluent to be employed also aids in removing poisons from the preparative system.

As a result of the above-described preparation there is obtained a solid reaction product suitable for use as a catalyst component. Prior to such use, it is desirable to remove incompletely-reacted starting materials from the solid reaction product. This is conveniently accomplished by washing the solid, after separation from any preparative diluent, with a suitable solvent, such as a liquid hydrocarbon or chlorocarbon, preferably within a short time after completion of the preparative reaction because prolonged contact between the catalyst component and unreacted starting materials may adversely affect catalyst component performance.

Although not required, the solid reaction product prepared as described herein may be contacted with at least one liquid Lewis acid prior to polymerization. Such Lewis acids useful according to this invention are materials which are liquid at treatment temperatures and have a Lewis acidity high enough to remove impurities such as unreacted starting materials and poorly affixed compounds from the surface of the above-described solid reaction product. Preferred Lewis acids include halides of Group III-V metals which are in the liquid state at temperatures up to about 170° C. Specific examples of such materials include $BCl_3$, $AlBr_3$, $TiCl_4$, $TiBr_4$, $SiCl_4$, $GeCl_4$, $SnCl_4$, $PCl_3$ and $SbCl_5$. Preferable Lewis acids are $TiCl_4$ and $SiCl_4$. Mixtures of Lewis acids can be employed if desired.

Although not required, the above-described solid reaction product may be washed with an inert liquid hydrocarbon or halogenated hydrocarbon before contact with a Lewis acid. Suitable inert liquids include those identified hereinabove as pretreatment and preparative diluents. If such a wash is conducted it is preferred to substantially remove the inert liquid prior to contacting the washed solid with Lewis acid.

The liquid Lewis acid employed according to the invention preferably is used neat although it also is contemplated to employ liquid Lewis acid diluted with up to about 40 vol. % of an inert solvent therefor. Suitable solvents include those materials useful as diluents in preparation of pretreatment product and supported catalyst component as described hereinabove. Of course, any such solvent should be purified prior to use. The amount of Lewis acid used, whether neat or diluted, is not critical. From a practical standpoint, however, the amount should be great enough to provide a high degree of contact between the solid and liquid, but not so great as to waste the Lewis acid or require excessively large vessels for the contacting. Most preferably, from about 3 to about 10 milliliters of Lewis acid are used for each gram of solid to be treated.

Temperature in the liquid Lewis acid-contacting step is at least high enough to avoid solidification of the Lewis acid employed, but not so high as to adversely affect ultimate catalyst component performance. Preferred temperatures range from about 0° to about 170° C. When $TiCl_4$ is used as the Lewis acid, temperatures of about 20° to about 135° C. are preferred to maintain desirable improvements in catalytic performance while avoiding waste of $TiCl_4$ through vaporization thereof and exposure of catalyst components to conditions more severe than necessary.

The time of contact with liquid Lewis acid is not critical and generally ranges from several minutes to several hours. It is desirable to agitate the solid and Lewis acid during at least a substantial portion of this time to ensure a high degree of contact. Preferred contact times range from 1 to about 30 minutes as the same yield the desired improvements without occupying preparation equipment for undesirably lengthy periods of time.

As in preparation of the solid reaction product, the Lewis acid-contacting step according to this invention is conducted in the substantial absence of oxygen, water, carbon oxides and extraneous catalyst poisons. Such materials are excluded by any convenient manner as described hereinabove.

Following contacting with Lewis acid, solids are allowed to settle and supernatant is removed therefrom such as by filtration or decantation. One or more additional Lewis acid-contacting steps can be carried out with the same or different Lewis acid. In addition, a series of alternating Lewis acid and inert liquid hydrocarbon or halogenated hydrocarbon washes can be conducted if desired.

Prior to use in the polymerization of alpha-olefins, the catalyst components used in this invention may be mechanically activated by comminution. Mechanical activation improves the polymerization performance of the invented catalyst components, whether or not treated with Lewis acid, in terms of both activity and susceptibility to modification by crystallinity-promoting modifiers; however, comminution typically forms a catalyst component which yields increased noncrystalline products. The preferred technique for mechanically activating the invented catalyst components is dry ball-milling, that is, ball-milling in substantial absence of inert diluent. However, good results also can be obtained by ball-milling in the presence of a minor amount of an inert diluent such as hexane or another alkane, as well as by other techniques. The above-described catalyst components can be comminuted in the presence of one or more organic electron donors of the general type employed in preparation of the catalyst components. Techniques of comminution by ball-milling generally are known in the art. Typically, titanium-containing catalyst component and hard, nonreactive balls, such as steel or burundum balls, are placed in a closed container which is agitated, usually by rolling, shaking or rocking. Such comminution is continued for a few hours up to several days, typically about 12 to about 36 hours, until the catalyst component is ground to a desired particle size, typically about 5 to about 50 microns. Since mechanical action of comminution can cause a temperature increase in the comminuting mixture, care should be taken to keep the temperature below the decomposition temperature of the catalyst component. Typically, the comminuting mixture should be kept below about 50° C. Optimum comminution techniques for a specific catalyst component can be determined by routine experimentation.

Optimum polymerization performance is attained by treating with Lewis acid and then mechanically activating. Treatment of mechanically activated catalyst component with Lewis acid alone is not preferred as it may result in agglomeration of the component and inferior polymerization performance.

Comminuted titanium-containing catalyst component may be retreated by contact with a halide-containing titanium(IV) compound such as titanium tetrachloride and at least one alkyl aromatic ester, such as ethyl benzoate or a dialkylphthalate ester, and, optionally, a chlorocarbon, such as carbon tetrachloride, an organochlorosilane or a mixture thereof.

In retreatment of a comminuted supported titanium-containing catalyst component according to this invention, a retreatment amount of titanium(IV) compound is contacted with the comminuted product. Typically, the atomic ratio of retreatment titanium(IV) to titanium contained in the comminuted catalyst component is about 50:1 to about 500:1 and preferably is about 200:1 to about 250:1. Preferably, retreatment titanium(IV) compound is diluted in a liquid hydrocarbon during retreatment.

Although the chemical structure of the catalyst components described herein is not presently known, the components preferably contain from about 1 to about 6 wt. % titanium, from about 10 to about 25 wt. % magnesium, less than about 1 wt. % Group IIIA metal and from about 45 to about 65 wt. % halogen. From the standpoint of attaining maximum efficiency of titanium, catalyst components which are more preferred according to this invention contain from about 1.5 to about 3 wt. % titanium, from about 15 to about 20 wt. % magnesium, less than about 0.5 wt. % Group IIIA metal, and from about 50 to about 60 wt. % chlorine.

Comminuted catalyst may be prepolymerized with an alpha-olefin before use as a polymerization catalyst component. In prepolymerization comminuted catalyst and an organoaluminum compound co-catalyst such as triethylaluminum are contacted with an alpha-olefin such as propylene under polymerization conditions, preferably in the presence of a modifier such as methyl p-toluate and in an inert hydrocarbon such as hexane. Typically, the polymer/catalyst weight ratio of the resulting prepolymerized component is about 0.1:1 to about 20:1. Prepolymerization forms a coat of polymer around catalyst particles which in many instances improves particle morphology, activity and stereospecificity.

The above-described catalysts of this invention are useful in polymerization of alpha-olefins such as ethylene and propylene, and are most useful in stereospecific polymerization of alpha-olefins containing 3 or more carbon atoms such as propylene, butene-1, pentene-1, 4-methylpentene-1, and hexene-1, as well as mixtures thereof and mixtures thereof with ethylene. The invented catalysts are particularly effective in the stereospecific polymerization of propylene or mixtures thereof with up to about 20 mole % ethylene or a higher alpha-o-lefin. Propylene homopolymerization is most preferred. According to the invention, highly crystalline polyalphaolefins are prepared by contacting at least one alpha-o-lefin with the above-described catalyst compositions under polymerizing conditions. Such conditions include polymerization temperature and time, monomer pressure, avoidance of contamination of catalyst, choice of polymerization medium in slurry processes, the use of additives to control polymer molecular weights, and other conditions well known to persons of skill in the art. Slurry-, bulk-, and gas-phase polymerization processes are contemplated herein, although gas-phase is preferred.

The amount of catalyst to be employed varies depending on choice of polymerization technique, reactor size, monomer to be polymerized, and other factors known to persons of skill in the art, and can be determined on the basis of the examples appearing hereinafter. Typically, catalysts of this invention are used in amounts ranging from one gram of catalyst to about 4000 to about 15,000 grams of polymer produced, although more or less may be useful.

Irrespective of the polymerization process employed, polymerization should be carried out at temperatures sufficiently high to ensure reasonable polymerization rates and avoid unduly long reactor residence times, but not so high as to result in the production of unreasonably high levels of stereorandom products due to excessively rapid polymerization rates. Generally, temperatures range from about 0° to about 120° C. with about 20° to about 95° C. being preferred from the standpoint of attaining good catalyst performance and high production rates. More preferably, polymerization according to this invention is carried out at temperatures ranging from about 50° to about 80° C.

Alpha-olefin polymerization according to this invention is carried out at monomer pressures of about atmospheric or above. Generally, monomer pressures range from about 20 to about 600 psi, although in vapor phase polymerizations, monomer pressures should not be below the vapor pressure at the polymerization temperature of the alpha-olefin to be polymerized.

The polymerization time will generally range from about ½ to several hours in batch processes with corresponding average residence times in continuous processes. Polymerization times ranging from about 1 to about 4 hours are typical in autoclave-type reactions. In slurry processes, the polymerization time can be regulated as desired. Polymerization times ranging from about ½ to several hours are generally sufficient in continuous slurry processes.

Diluents suitable for use in slurry polymerization processes include alkanes and cycloalkanes such as pentane, hexane, heptane, n-octane, isooctane, cyclohexane, and methylcyclohexane; alkylaromatics such as toluene, xylene, ethylbenzene, isopropylbenzene, ethyl toluene, n-propyl-benzene, diethylbenzenes, and mono- and dialkylnaphthalenes; halogenated and hydrogenated aromatics such as chlorobenzene, chloronaphthalene, ortho-dichlorobenzene, tetrahydronaphthalene, decahydronaphthalene; high molecular weight liquid paraffins or mixtures thereof, and other well-known diluents. It often is desirable to purify the polymerization medium prior to use, such as by distillation, percolation through molecular sieves, contacting with a compound such as an alkylaluminum compound capable of removing trace impurities, or by other suitable means.

Examples of gas-phase polymerization processes in which the catalyst of this invention is useful include both stirred bed reactors and fluidized bed reactor systems are described in U.S. Pat. Nos. 3,957,448, 3,965,083, 3,971,768, 3,970,611, 4,129,701, 4,101,289; 3,652,527 and 4,003,712 all incorporated by reference herein. Typical gas phase olefin polymerization reactor systems comprise a reactor vessel to which olefin monomer and catalyst components can be added and which contain an agitated bed of forming polymer particles. Typically, catalyst components are added together or separately through one or more valve-controlled ports in the reactor vessel. Olefin monomer, typically, is provided to the reactor through a recycle gas system in which unreacted monomer removed as off-gas and fresh feed monomer are mixed and injected into the reactor vessel. A quench liquid which can be liquid monomer, can be added to polymerizing olefin through the recycle gas system in order to control temperature.

Irrespective of polymerization technique, polymerization is carried out under conditions that exclude oxygen, water, and other materials that act as catalyst poisons. Typically, no special precautions need be taken to exclude such materials because a positive pressure of monomer gas commonly exists within the reactor.

Also, according to this invention, polymerization can be carried out in the presence of additives to control polymer molecular weights. Hydrogen is typically employed for this purpose in a manner well known to persons of skill in the art.

Although not usually required, upon completion of polymerization, or when it is desired to terminate polymerization or deactivate the catalysts of this invention, the catalyst can be contacted with water, alcohols, acetone, or other suitable catalyst deactivators in a manner known to persons of skill in the art.

The products produced in accordance with the process of this invention are normally solid, predominantly isotactic polyalpha-olefins. Polymer yields are sufficiently high relative to the amount of catalyst employed so that useful products can be obtained without separation of catalyst residues. Further, levels of stereorandom by-products are sufficiently low so that useful products can be obtained without separation thereof. The polymeric products produced in the presence of the invented catalysts can be fabricated into useful articles by extrusion, injection molding, and other common techniques.

Irrespective of the invention claimed herein, examples of possible chloride-containing co-catalyst compositions are based upon a trialkylaluminum such as triethylaluminum, a source of Al—Cl groups and an organo electron donor such as an organic ester. In this use, examples of trialkylaluminum species include RR'R"Al wherein R,R' and R" are alkyl groups containing 2 to about 6 carbon atoms such as triethylaluminum, tripropylaluminum or tributylaluminum. Examples of sources of Al—Cl groups include $AlCl_3$, alkylaluminum dichloride such as ethylaluminum dichloride and dialkylaluminum chlorides such as diethylaluminum dichloride and diisobutylaluminum chloride. Typical organic esters include ethyl benzoate, ethyl-p-anisate, methyl p-anisate, methyl p-toluate and dialkylphthalate esters such as diisobutylphthalate. In such three-component chloride-containing systems, aluminum/ester and Cl/ester molar ratios are important to obtain good performance. For example, best stereospecificity typically is obtained in gas phase or bulk polymerization with $1.0 \geq Cl/ester \geq 3.0$ and $3 \leq Al/ester \leq 2$, while in slurry phase the best conditions are in the molar ratio range $Al/Cl/ester = 3-8/2-5/1$ and $Al/Ti = 50-200$. If a chloride-containing co-catalyst component is not troublesome, diisobutylaluminum hydride combined with a secondary amine, such as piperidine and/or dicyclohexylamine, and a chloride-containing alkylaluminum compound such as diethylaluminum chloride can be used. Other co-catalyst compositions include reaction products of dialkylaluminum hydride, such as diethylaluminum hydride, and hindered amine including tetraalkyl piperidines such as 2,2',6,6'-tetramethylpiperidine. The reaction product of diethylaluminum hydride and 2,2',6,6'-tetramethylpiperidine is a white crystalline solid identified as ethyl (2,2',6,6'-tetramethylpiperidine) aluminum hydride. Such co-catalysts may be used in conjunction with trialkylaluminum, such as triethylaluminum, and dialkylaluminum halides, such as dialkylaluminum chloride. A hindered amine such as 2,2',6,6'-tetramethylpiperidine sometimes is useful in a cocatalyst composition to improve supported catalyst feeding and to reduce fines and lumps in the polymer powder produced. Supported catalysts may be combined with a mixture or trialkylaluminum or alkylaluminum halide such as diethylaluminum chloride and an ester such as methyl p-toluate before addition to the reactor. Silyl halides such as ethyl trichlorosilane, silicon tetrachloride, trimethylchlorosilane and dimethyldichlorosilane sometimes are useful in cocatalyst systems. Other silane compounds also can be useful in cocatalyst compositions such as alkyl, alkoxy and/or aromatic substituted silanes including phenyltriethoxysilane, diphenyldimethoxysilane, diphenyldiethoxysilane, phenyltrimethoxysilane and phenytriisobutylsilane.

The following examples demonstrate but do not limit the described invention.

EXAMPLES AND COMPARATIVE RUNS
PREPARATION OF TITANIUM-CONTAINING COMPONENT

Step A: Preparation of Pretreated Magnesium-containing Component

Into a one-liter flask equipped with magnetic stirrer and maintained under nitrogen in a drybox were added 200 milliliters of dry n-hexane and 25.0 grams of anhydrous magnesium ethoxide (obtained from Dynamit Nobel) at ambient temperature. The resulting suspension was stirred and 25 milliliters of a mixture of a 25 wt. % solution of triethylaluminum (TEA) in dry n-hexane was added. Stirring was continued for one hour following completion of the addition of TEA solution and then the solid reaction product was allowed to settle. The supernatant then was decanted and the solid was washed eight times with 100-milliliter portions of dry n-hexane and then dried under a stream of nitrogen gas for about 20 minutes.

Step B: Preparation of Supported Catalyst Component

The solid from Step A was resuspended in a one-liter resin kettle equipped with an overhead stirrer in 50 milliliters of carbon tetrachloride, 50 milliliters of 1,2-dichloroethane and 100 milliliters of titanium tetrachloride at ambient temperature. To the resulting mixture, six milliliters of ethyl benzoate were added dropwise over a period of about 3 minutes at ambient temperature with stirring at 500 rpm. After addition of the ester was completed, the resulting mixture was heated to 90° to 95° C., stirred at this temperature for 1.75 hours, and then allowed to cool. The supernatant then was decanted, about 150 milliliters of dry n-hexane were added, and the solid was separated from the liquid by filtration and dried.

Step C: Comminution of Supported Catalyst Component

The solid catalyst component prepared in Step B and 70 stainless steel balls having a diameter of 10 millimeters were placed in a Roalox, burundum-fortified porcelain mill jar (manufactured by A. Daigger Company) having a capacity of ¼ quart (about 280 milliliters) and milled in a rotary ball mill (manufactured by Paul O. Abbe, Inc., rolling speed=120 rpm) for 16 hours at ambient temperature under an atmosphere of dry nitrogen. The solid was sieved to remove all particles which could not pass through a 200 mesh (U.S. Sieve Series) sieve.

Step D: Retreatment of Comminuted Catalyst Component

The solid obtained from Step C was mixed with equal portions of 1,2-dichloroethane and of carbon tetrachloride (each at 2–3 ml/gram of solid) and an excess of titanium tetrachloride (6–7 ml/gram of solid) was added. After 0.02–0.03 milliliter of ethylbenzoate per milliliter of titanium tetrachloride was added dropwise to this mixture with stirring at 400–500 rpm, the resulting suspension was heated to 95°–100° C. for 1.5 hours while stirring. After cooling to 80° C., the solid product was allowed to settle, supernatant liquid was removed by decantation and the residue washed five times with 150-milliliter portions of n-hexane. The remaining solid was filtered and dried.

Examples I–VII

A series of propylene polymerization runs was performed in a laboratory scale continuous unit based on that described in U.S. Pat. No. 3,965,083. A cylindrical reactor vessel of approximately four inches in diameter and 12 inches in length was equipped with three recycle gas nozzles spaced equidistantly along the bottom of the reactor and three liquid quench nozzles spaced equidistantly along the top of the reactor. The reactor was equipped with an off-gas port for recycling reactor gas through a condenser and back through a recycle gas line to the recycle gas nozzles in the reactor. During operation polypropylene powder was produced in the reactor bed, flowed over a weir, and discharged though a powder discharge system into a secondary closed vessel blanketed with nitrogen. Polymerization temperature and pressure was maintained at 160° F. and 300 psig respectively. The polymer bed was agitated by paddles attached to a longitudinal shaft with in the reactor rotating at about 40 rpm. Hydrogen content in the recycle gas was maintained at 2–4%. Except where noted, titanium-containing catalyst component was introduced into the reactor through a liquid propylene-flushed catalyst addition nozzle. A separate addition sequence is used to add mixed co-catalyst, chilled to 30° F. through a co-catalyst addition nozzle. Activity was determined by dividing Yield measured by magnesium atomic absorption analysis by residence time.

In this series of polymerizations, piperidine (PiP), 2,6-dimethylpiperidine (DMPiP) and 2,2',6,6'-tetramethylpiperidine (TMPiP) were used in the cocatalyst system with various ratios of triisobutylaluminum (TIBA) and methyl p-toluate (MpT). A comparison run using diethylaluminum chloride (DEAC) also is shown. Results are presented in Table I.

Comparative Runs were performed demonstrating the special usefulness of the catalyst of this invention in gas-phase polymerization with respect to bulk and slurry polymerizations. Bulk propylene polymerizations were conducted using aliquots of titanium-containing catalyst components prepared above. Portions of aluminum alkyl and co-catalyst and 10 milligrams of titanium-containing catalyst component were combined in a drybox under nitrogen and flushed into a two-liter Parr reactor in 300 milliliters of propylene. After an additional 1000 milliliters of propylene and 42 millimoles of hydrogen were charged to the reactor, the reactor was closed and polymerization conducted at 160° F. for two hours. After the reactor was cooled and vented, the resulting solid polymer was air dried overnight and then weighed. Slurry polymerizations were conducted in 780 milliliters of n-hexane contained in a 2-liter autoclave equipped with a mechanical stirrer. Polymerization was continued for two hours at 160° F. at 250 psig using 30 milligrams of catalyst, after which time solid polypropylene was removed from the reactor, filtered, dried and weighed. Gas-phase polymerizations were performed as described above. Results are shown in Table II. The amount of "Extractables" was determined by measuring the loss in weight of a dry sample of ground polymer after being extracted in boiling n-hexane for six hours. Hexane "Solubles" were determined by evaporation of the filtrate to dryness and weighing the residue.

Active Chloride is measured as the amount of hydrogen chloride gas evolved while passing a stream of nitrogen over a molten polypropylene sample at 300° C. in parts per million by weight (ppm). Typically, "active chloride" determinations are run in duplicate or triplicate with each measurement reported individually.

The data in Table I show generally that in gas phase polymerization a co-catalyst formulation based on piperidine is preferred over a similar formulation based on tetramethylpiperidine. Run J is presented to show a typical co-catalyst system yielding high "active chloride" levels. Examples of this invention approach the activity-stereospecificity performance of such a catalyst producing substantial amounts of "active chloride." Table II clearly shows the advantage of the catalysts of this invention when used in gas-phase propylene polymerization.

TABLE I

| Example (Run) | R$_2$NH | Al/Ti | Yield (g/g) | Activity (g/g/hr) | Extractables (wt %) |
|---|---|---|---|---|---|
| | | TIBA/MpT/R$_2$NH | | | |
| A | TMPiP | 2.75/1/1 | 292 | 5600 | 2100 | 1.9 |
| B | TMPiP | 3.0/1/1 | 294 | 5800 | 2300 | 2.5 |
| C | TMPiP | 3.25/1/1 | 258 | 5600 | 2700 | 2.5 |
| D | TMPiP | 3.75/1/1 | 259 | 7400 | 3500 | 2.8 |
| E | TMPiP | 4.25/1/1 | 259 | 8200 | 4100 | 3.3 |
| F | TMPiP | 4.25/1/1 | 259 | 7800 | 3900 | 3.4 |
| G | TMPiP | 4.25/1/1 | 293 | 8000 | 4000 | 3.4 |
| H | DMPiP | 4.25/1/1 | 259 | 6000 | 2600 | 4.3 |
| I | PiP | 4.25/1/1 | 293 | 9200 | 5400 | 3.9 |
| II | PiP | 4.25/1/1 | 293 | 12000 | 7100 | 4.7[1] |
| III | PiP | 4.25/1/2 | 290 | 5100 | 2200 | 3.3[2] |
| IV | PiP | 4.25/1/2 | 290 | 6000 | 3200 | 2.9[3] |
| V | PiP | 3.75/1/1 | 292 | 5200 | 2600 | 2.6 |
| VI | PiP | 4.25/1/1 | 259 | 10600 | 1.7 | 4.3 |
| | | TIBA/DEAC/MpT | | | |
| J | — | 2.25/2.5/1 | 347 | 10400 | 6900 | 2.7[4] |

[1] Active chloride in air-killed powder = 0,0
[2] Precipitate formed upon chilling of co-catalyst; mixture was warmed to ambient temperature before use.
[3] Co-catalyst mixture aged 12 hours.
[4] Active chloride in air-killed powder = >126,147,86

TABLE II

| Example (Run) | Type[1] | R$_2$NH | TIBA/MpT/R$_2$NH | Yield (g/g) | Activity (g/g/hr) | Extractables (wt %) | Solubles (wt %) |
|---|---|---|---|---|---|---|---|
| K | Slry | TMPiP | 4.0/1/1 | 8515 | 4300 | 1.0 | 2.7 |
| M | Bulk | TMPiP | 4.25/1/1 | 12200 | 6100 | 2.9 | — |
| VII | G-P | TMPiP | 4.25/1/1 | 8000 | 4000 | 3.4 | — |
| N | Slry | PiP | 4.0/1/1 | 775 | 400 | — | 2.6 |
| P | Bulk | PiP | 4.25/1/1 | 6400 | 3200 | 1.9 | — |
| VIII | G-P | PiP | 4.25/1/1 | 12000 | 7100 | 4.7 | — |

[1] G-P = gas-phase; Slry = slurry

Examples IX-XV

A series of propylene polymerizations was run similar to that described in Example I using a co-catalyst component containing a reaction product of a dialkylaluminumhydride and a secondary amine. In these examples, 42.6 grams (0.3 mole) of diisobutylaluminumhydride were added to 150 milliliters of hexane. To this mixture 30.0 milliliters of piperidine were added slowly over 1.5 hours accompanied by gas evolution and heating of the reaction solution. After piperidine addition, sufficient hexane was added to produce 300 milliliters total volume. The resulting mixture, 1.0 Molar in aluminum components, was used as a co-catalyst component in propylene polymerization as described in Example I. The results of these polymerizations including comparative runs using co-catalyst components prepared similarly but incorporating tetramethylpiperidine or diethylaluminum chloride are shown in Table III. Co-catalyst mixture was maintained at ambient temperature except as noted. The data contained in Table III show that, at comparable conditions in gas-phase polymerization, use of piperidine in the co-catalyst composition show significant improvement in extractables content compared to use of 2,2,6,6-tetramethylpiperidine. Additionally, powder produced from polymerizations not using diethylaluminum chloride show a lower active chloride level and a higher flexural modulus than measured in Run U in which DEAC is used.

TABLE III

| Example (Run) | R$_2$NH | Al/Ti | Yield (g/g) | Activity (g/g/hr) | Extractables (wt %) |
|---|---|---|---|---|---|
| | | TIBA/MpT/DIBAG.R$_2$NH | | | |
| Q | TMPiP | 2.25/1/1 | 158 | 5200 | 1800 | 2.5 |
| R | TMPiP | 2.75/1/1 | 128 | 9200 | 5400 | 3.7 |
| S | TMPiP | 3.0/1/1 | 154 | 8200 | 5500 | 3.6 |
| T | TMPiP | 3.0/1/1 | 154 | 10400 | 5200 | 4.3 |
| IX | PiP | 3.0/1/1 | 154 | 8200 | 4800 | 2.6 |
| X | PiP | 3.0/1/1 | 154 | 8200 | 4600 | 2.3[1,3] |
| XI | PiP | 3.25/1/1 | 158 | 8200 | 4600 | 2.2 |
| XII | PiP | 3.25/1/1 | 158 | 7800 | 4300 | 2.2[1] |
| XIII | PiP | 3.0/1/1.5 | 159 | 7800 | 4300 | 2.3 |
| XIV | PiP | 3.0/1/1.5 | 159 | 8700 | 4100 | 2.3 |
| | | TIBA/TEA/MpT/DIBAH.R$_2$NH | | | |
| XV | PiP | 2.0/1/1/1 | 154 | 8700 | 4600 | 1.8[2] |
| | | TIBA/DEAC/MpT | | | |
| U | — | 2.25/2.5/1 | 347 | 10400 | 6900 | 2.7[2,4] |

[1] Co-catalyst aged 30 hours.
[2] Co-catalyst chilled to −30° F.
[3] Active chloride = 0,0; Flexural modulus = 233,000 psi
[4] Active chloride = 147,86,>126; Flexural modulus = 217,000 psi

Examples XVI-XXIV

A series of propylene polymerizations was run similar to that described in Example I using a different batch of titanium-containing component. The co-catalyst used in these examples was a reaction product of diisobutyl aluminum hydride and an unhindered secondary amine including piperidine (PiP) and di-n-propylamine (DNPA). A mixture of triethyl aluminum (TEA) and triisobutyl aluminum (TIBA) was used together with methyl p-toluate (MpT). Results are shown in Table IV. Comparative Run W without an amine product also is shown.

TABLE IV

| Example (Run) | Temp (°F.) | Al/Ti | Yield (g/g) | Activity (g/g/hr) | Extractables (wt %) |
|---|---|---|---|---|---|
| | | TIBA/TEA/MpT/DIBAH.PiP | | | |
| W | 150 | 1.5/1.5/1/0 | 301 | 8600 | 5100 | 4.3 |
| XVI | 160 | 1/4/1/4/1 | 288 | 4400 | 1700 | 2.7 |
| XVII | 160 | 1.5/1.5/1/1 | 301 | 6800 | 3100 | 3.2 |
| XVIII | 170 | 1.5/1.5/1/1 | 301 | 6300 | 2600 | 2.4 |
| XIX | 150 | 1.5/1.5/1/1 | 301 | 8600 | 5100 | 3.4 |
| XX | 160 | 2.0/1/1/1 | 301 | 6800 | 3800 | 3.5 |
| | | TIBA/TEA/MpT | | | |

TABLE IV-continued

| Example (Run) | Temp (°F.) | Al/Ti | Yield (g/g) | Activity (g/g/hr) | Extractables (wt %) |
|---|---|---|---|---|---|
| | DIBH.DNPA | | | | |
| XXI | 160 | 2.0/1/1/1 | 301 | 6300 | 3300 | 3.8 |
| XXII | 160 | 2.0/1/1/2 | 302 | 5900 | 3100 | 6.0 |
| XXIII | 160 | 2.25/1/1/1 | 316 | 5900 | 2800 | 4.1 |
| XXIV | 160 | 2.0/1/1/1 | 309 | 8700 | 4600 | 2.7 |

Examples XXV

Another series of propylene polymerizations was run similar to that described in Example I using another different batch of titanium-containing component. The co-catalyst used in these examples was a reaction product of a dialkylaluminum hydride and a secondary amine such as piperidine (PiP) and dicyclohexylamine (DCHXA). The trialkyl aluminum component was a 1:1 mixture of triethyl aluminum (TEA) and triisobutyl aluminum (TIBA). Methyl p-toluate (MpT), methyl anisate (MA) or ethyl anisate (EA) was included. Results are shown in Table V.

TABLE V

| Example (Run) | Temp (°F.) | Al/Ti | Yield (g/g) | Activity (g/g/hr) | Extractables (wt %) |
|---|---|---|---|---|---|
| | TIBA/TEA/MpT/DIBAH.PiP | | | | |
| XXV | 150 | 1.55/1.55/1/1 | 284 | 10800 | 7700 | 4.6 |
| XXVI | 150 | 1.55/1.55/1/1 | 284 | 9500 | 6800 | 3.3 |
| XXVII | 150 | 1.4/1.4/1/1 | 280 | 5200 | 2300 | 3.2 |
| XXVIII | 150 | 1.4/1.4/1/1 | 280 | 4600 | 2000 | 2.4 |
| XXIX | 160 | 1.55/1.55/1/1 | 284 | 7000 | 3300 | 3.6 |
| XXX | 160 | 1.55/1.55/1/1 | 284 | 9500 | 4500 | 4.6 |
| XXXI | 160 | 2.0/2.0/1/1 | 282 | 9500 | 6300 | 3.7 |
| XXXII | 160 | 2.0/2.0/1/1 | 282 | 9500 | 6300 | 3.9 |
| | TIBA/TEA/MA/DIBAH.PiP | | | | |
| XXXIII | 160 | 2.5/1/1/1 | 312 | 8100 | 4100 | 3.8 |
| XXXIV | 160 | 2.5/1/1/1 | 312 | 7000 | 3500 | 3.4 |
| XXXV | 160 | 2.75/1/1/1 | 327 | 9000 | 5000 | 4.6 |
| XXXVI | 160 | 2.75/1/1/1 | 327 | 9000 | 5000 | 5.2 |
| XXXVII | 150 | 2.5/1/1/1 | 312 | 9000 | 5600 | 3.4 |
| XXXVIII | 150 | 2.5/1/1/1 | 312 | 8100 | 5100 | 2.6 |
| XXXIX | 150 | 2.75/1/1/1 | 327 | 9000 | 5000 | 3.0 |
| XL | 150 | 2.75/1/1/1 | 327 | 9000 | 5000 | 3.5 |
| | TIBA/TEA/MpT/DIBAH.DCHXA | | | | |
| XLI | 160 | 2.0/1/1/1 | 282 | 8500 | 5000 | 3.8 |
| XLII | 160 | 2.0/1/1/1 | 282 | 10100 | 5000 | 4.5 |
| XLIII | 150 | 2.0/1/1/1 | 282 | 10800 | 7200 | 3.5 |
| XLIV | 150 | 2.0/1/1/1 | 282 | 10800 | 7200 | 3.5 |
| XLV | 150 | 2.5/1/1/1 | 312 | 14700 | 11300 | 4.7 |
| XLVI | 150 | 2.5/1/1/1 | 312 | 12500 | 9600 | 4.8 |
| XLVII | 150 | 2.25/1/1/1 | 297 | 10100 | 6300 | 4.4 |
| XLVIII | 150 | 2.25/1/1/1 | 297 | 10100 | 6300 | 4.4 |
| XLIX | 150 | 2.0/1/1/1 | 282 | 9500 | 5900 | 4.0 |
| L | 150 | 2.0/1/1/1 | 282 | 9500 | 5900 | 3.5 |
| LI | 150 | 1.75/1/1/1 | 268 | 9500 | 5300 | 3.4 |
| LII | 150 | 1.75/1/1/1 | 268 | 9500 | 5300 | 3.2 |
| | TIBA/TEA/EA/DIBAH.DCHXA | | | | |
| LIII | 150 | 2.0/1/1/1 | 282 | 9500 | 5900 | 4.0 |
| LIV | 150 | 2.0/1/1/1 | 282 | 9000 | 5600 | 4.3 |
| LV | 150 | 2.25/1/1/1 | 297 | 9500 | 5900 | 4.3 |
| LVI | 150 | 2.25/1/1/1 | 297 | 9500 | 5900 | 4.4 |

What is claimed is:

1. A catalyst system suitable for gas-phase polymerization of alpha-olefins to polymers containing essentially no active chloride comprising:
   A. a titanium-containing component supported on a hydrocarbon-insoluble magnesium-containing compound in combination with an electron donor compound; and
   B. a co-catalyst comprising (a) at least one trialkyl aluminum compound, (b) an aromatic acid ester, and (c) an unhindered secondary amine, such secondary amine having no more than one methyl group on a carbon atom adjacent to a nitrogen atom, optionally reacted with a dialkylaluminum hydride, in substantial absence of compounds containing an Al—Cl bond.

2. The catalyst of claim 1 wherein the unhindered secondary amine contains alkyl groups having from two to about eight carbon atoms or is a cyclic aliphatic secondary amine containing from four to about ten carbon atoms.

3. The catalyst of claim 1 wherein the unhindered amine is piperidine, 2-methylpiperidine, pyrrolidine, homopiperidine, piperazine, dicyclohexylamine or di-n-propylamine.

4. The catalyst of claim 1 wherein the unhindered amine is piperidine, pyrrolidine, homopiperidine or piperazine.

5. The catalyst of claim 1 wherein the unhindered amine is piperidine.

6. The catalyst of claim 1 wherein the trialkyl aluminum is triethylaluminum, triisobutylaluminum or a combination thereof.

7. The catalyst of claim 1 wherein the trialkyl aluminum is triisobutylaluminum.

8. The catalyst of claim 1 wherein the unhindered secondary amine is complexed with a dialkylaluminum hydride in which the alkyl groups contain from about four to about six carbon atoms.

9. The catalyst of claim 1 wherein the aromatic acid ester contained in the cocatalyst is ethylbenzoate, ethyl anisate, methyl p-toluate or methyl p-anisate.

10. The catalyst of claim 9 wherein the aromatic acid ester is methyl p-toluate.

11. The catalyst of claim 1 wherein the titanium-containing component is formed by reacting a titanium tetrahalide with a magnesium alcoholate.

12. The catalyst of claim 1 wherein the titanium-containing componenet is formed by reacting a titanium tetrahalide with a magnesium halide.

13. The catalyst of claim 1 wherein the electron donor is at least one aromatic acid ester.

14. A catalyst system suitable for gas-phase polymerization of alpha-olefins to polymers containing essentially no active chloride comprising.
A. a titanium-containing component supported on a hydrocarbon-insoluble magnesium-containing compound in combination with an aromatic acid ester; and
B. a co-catalyst comprising (a) triethylaluminum, triisobutylaluminum or a combination thereof, (b) an aromatic acid ester selected from the group consisting of ethylbenzoate, ethylanisate, methyl p-anisate and methyl p-toluate, and (c) a cyclic unhindered secondary amine, such secondary amine having no more than one methyl group on a carbon atom adjacent to a nitrogen atom, containing from four to about 10 carbon atoms, optionally reacted with a dialkylaluminum hydride, in substantial absence of compounds containing an Al—Cl bond.

15. The catalyst of claim 14 wherein the trialkylaluminum is triisobutylaluminum.

16. The catalyst of claim 15 wherein the aromatic acid ester is methyl p-toluate.

17. The catalyst of claim 15 wherein the cyclic secondary amine is piperidine.

18. The catalyst of claim 16 wherein amine is piperidine.

19. The catalyst of claim 17 wherein the cyclic secondary amine is complexed with an approximately equivalent amount of diisobutylaluminum hydride.

* * * * *